2,846,416
Patented Aug. 5, 1958

2,846,416

PROCESS OF CURING POLYALKYLENEETHER POLYURETHANE POLYMERS CONTAINING ETHYLENICALLY UNSATURATED SIDE CHAINS

Robert G. Arnold, Salem, N. J., and Clifton L. Kehr and John J. Verbanc, Wilmington, Del., assignors to E. I. du Pont de Nemours and Company, Wilmington, Del., a corporation of Delaware No Drawing. Application July 25, 1956
Serial No. 599,936

3 Claims. (Cl. 260—77.5)

This invention relates to a process of curing polyurethane polymers, and more particularly to a process of curing polyurethane polymers having side chains containing terminal aliphatic $-CH=CH_2$ groups.

Polyurethane polymers having side chains containing $C=C$ curing sites which are cured by a sulfur curing procedure have been found to have properties which are much superior to those products which are obtained from polyurethane polymers having recurring urea groups in the chain which have been cured by using organic diisocyanates. However, considerable difficulty has been encountered in effecting a cure of these polyurethane polymers having side chains containing $C=C$ curing sites since the conventional sulfur curing systems which are used for natural rubber, GR–S and neoprene are not effective, the curing cycle being erratic and the times involved being much longer than is permissible for a commercial curing process.

It is an object of the present invention to provide a process for curing polyurethane polymers. A further object is to provide a process for curing polyurethane polymers having side chains containing terminal $-CH=CH_2$ groups. A still further object is to provide a process for curing these polyurethane polymers which is economical and commercially practicable. Other objects will appear hereinafter.

These and other objects of the following invention are accomplished by the process of curing a sulfur curable polyalkyleneether polyurethane polymer, said polymer having a side chain at least once for every 8000 units of molecular weight of polymer, said side chain containing a terminal aliphatic $-CH=CH_2$ group, which comprises incorporating therewith for each 100 parts of polymer (a) from 0.5 to 2.0 parts of sulfur, (b) from 2.0 to 4.0 parts of 2,2'-dithiobisbenzothiazole, and (c) from 0.175 to 1.75 parts of a zinc halide complex selected from the group consisting of a 2-mercaptobenzothiazole-zinc halide complex and a 2,2'-dithiobisbenzothiazole-zinc halide complex wherein the zinc halide is selected from the group consisting of zinc chloride, zinc bromide and zinc iodide, and heating the polymer so as to effect a cure.

The curing process of the present invention enables the polyurethane polymers to be cured in a reasonable, economical period of time and the resulting cured elastomers exhibit many outstanding properties.

The polymers which may be cured according to the process of the present invention are wholly polyurethane polymers and they have side chains containing terminal aliphatic $-CH=CH_2$ groups. These polymers are more particularly described in U. S. Patent 2,808,391. In general, they may be prepared by reacting a polyalkyleneether glycol, such as a polytetramethyleneether glycol, having a molecular weight of from about 750 to 10,000, with a molar excess of an organic diisocyanate, such as toluene-2,4-diisocyanate, followed by the reaction with a non-polymeric glycol, such as a propanediol, with the side chain containing terminal $-CH=CH_2$ groups being present on any of these reactants. The reaction involved is between the terminal hydroxyl groups of the glycols with the terminal isocyanate groups of the organic diisocyanate so as to yield a polyurethane polymer. Another method which may be used is to first react the non-polymeric glycol with a molar excess of an organic diisocyanate and then react this isocyanate-terminated intermediate with a polyalkyleneether glycol.

In addition to the above discussed methods, polyurethane polymers which may be cured according to the process of the present invention may be prepared by reacting the polyalkyleneether glycol and the non-polymeric glycol with phosgene so as to form the bischloroformates which may then be reacted with a primary diamine so as to provide a polyurethane polymer. Instead of utilizing a primary diamine, a secondary diamine may be used, in which case the resulting polyurethane polymer would have no urethane nitrogens substituted with hydrogen. Polyurethanes prepared in this manner from a secondary diamine are more particularly described in copending application Serial No. 595,814, filed July 5, 1956, in the name of Goldberg.

The polyalkyleneether glycols which are useful in the preparation of the polyurethane polymers which may be cured according to the process of the present invention are compounds which have the general formula $H(OR)_nOH$, wherein R is an alkylene radical and $n$ is an integer sufficiently large that the glycol has a molecular weight of at least 750. Not all the alkylene radicals present need be the same. These glycols may be derived by the polymerization of cyclic ethers, such as alkyleneoxides or dioxolane or by the condensation of glycols. The preferred polyalkyleneether glycol is polytetramethyleneether glycol, also known as polybutyleneether glycol. Polyethyleneether glycol, polypropyleneether glycol, 1,2-polydimethylethyleneether glycol and polydecamethyleneether glycol are other typical representatives of this class.

Any of a wide variety of organic diisocyanates may be employed to react with the glycols to prepare these polyurethane polymers, including aromatic, aliphatic and cycloaliphatic diisocyanates and combinations of these types. It is to be understood that mixtures of two or more organic diisocyanates may be used. Representative compounds include toluene-2,4-diisocyanate, m-phenylene diisocyanate, 4-chloro-1,3-phenylene diisocyanate, 4-4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-(cyclohexyl isocyanate) and 1,5-tetrahydronaphthylene diisocyanate. Arylene diisocyanates, i. e., those in which each of the two isocyanate groups is attached directly to an aromatic ring, are preferred. Compounds such as toluene-2,4-diisocyanate in which the two isocyanate groups differ in reactivity are particularly desirable.

The non-polymeric glycols which are used in the preparation of these polyurethane polymers are compounds which should have molecular weights below about 200. In general, it is desirable that the side chain containing the terminal aliphatic $-CH=CH_2$ group be introduced into the polyurethane polymer by means of this non-polymeric glycol reactant. Representative compounds which may be used include 3-allyloxy-1,5-pentanediol, 3-(allyloxy) - 1,2 - propanediol, 2 - [(allyloxy)methyl] - 2 - methyl-1,3-propanediol, 2,2'-(4-allyl-m-phenylenedioxy)-diethanol, 3 - (o - allylphenoxy) - 1,2 - propanediol, 2-[(allyloxy)ethyl]-1,3-propanediol, 2-[(allyloxy)ethyl]-2-methyl-1,3-propanediol, 2-methyl-2-[(10-undecenyloxy)-methyl]-1,3-propanediol, 2,2'-(allylimino)-diethanol, 2-

[(allyloxy)methyl]-1,3-propanediol, and 3-(4-allyl-2-methoxyphenoxy)-1,2-propanediol.

As has been mentioned above, the polyurethane polymers which are cured according to the process of the present invention have side chains containing terminal —CH=CH₂ groups. These side chains serve as potential curing sites and it is by means of these side chains that the polymers may be cured by the sulfur curing process of this invention. There should be at least one of these side chains present for every 8000 units of molecular weight of polymer in order to assure the presence of a sufficient number of sites so that the polymer can be effectively cured. It is to be understood that there may be more side chains present and that the number of side chains may be in excess of the number actually utilized in the curing step. On the average, it is preferred to have not more than about one side chain per 500 units of molecular weight of polymer.

The curing process of the present invention involves the use of three essential ingredients, i. e., sulfur, 2,2'-dithiobisbenzothiazole, and a zinc halide complex. Conventional elastomer processing steps may be used in the fabrication of cured articles. In carrying out the process of the present invention for molded articles, the uncured polyurethane polymer is normally milled to a smooth sheet on a rubber mill and the various ingredients are incorporated with the polymer on the mill. The stock is then sheeted off the mill, placed in a suitable mold, which is then closed, and the curing process is completed by heating the mold under pressure. The temperature and time used to effect a cure are interrelated with the higher temperatures requiring shorter times. There is, of course, an upper limit on the temperature which may be used; however, in general temperatures of from about 100–170° C. are useful with curing times of from about one-half to three hours. The preferred temperatures which are used to effect the cure range from about 100–150° C.

The amount of sulfur which is used may range from about 0.5 to 2 parts per 100 parts of polyurethane polymer. It is to be understood that somewhat greater or lesser amounts of sulfur may be used with the greater amounts giving a progressively increasing tighter cure which is shown by an increased modulus. The amount of 2,2'-dithiobisbenzothiazole which is used should range from about 2 to 4 parts per 100 parts of elastomer; however, it is to be understood that here again greater or lesser amounts may be used. In general, it is desirable to have a weight ratio of sulfur to 2,2'-dithiobisbenzothiazole of less than 1:1, with a preferred weight ratio range being from 1:2 to 1:4.

The zinc halide complex is incorporated with the other ingredients in the polyurethane polymer and this complex will generate zinc halide, which acts as an accelerator, under the curing conditions which are used. It is desirable to add the zinc halide accelerator in this manner since there is some difficulty encountered in using the zinc halides as such due to their acid nature and the fact that they are extremely hygroscopic.

In order to avoid these undesirable features, a 1:1 molar complex of a zinc halide with a compound such as 2,2'-dithiobisbenzothiazole is used to readily incorporate the zinc halide with the polyurethane polymer on the rubber mill. A similar type complex which is used is a 2:1 molar complex of 2-mercaptobenzothiazole and the zinc halide. The above mentioned zinc halide complexes are more particularly described and claimed in application Serial No. 599,935, in the name of Kehr, filed of even date herewith. When incorporating the zinc halide as a complex from about 0.175 to 1.75 parts of the 2-mercaptobenzothiazole or the 2,2'-dithiobisbenzothiazole-zinc halide complex per 100 parts of polymer should be used so as to provide a sufficient amount of zinc halide.

In addition to the three essential ingredients which are used in the curing process of the present invention, it is to be understood that other additives and compounding ingredients may also be used. Activating agents and vulcanization accelerators, such as mercaptobenzothiazole, and pigmenting and refinishing substances, such as carbon black, whiting, silica, etc. may be used. It has been found that the presence of an activating agent, such as mercaptobenzothiazole, tends to result in a decreased curing time. In addition to the above mentioned additives, compounds such as zinc aryldithiocarbamates, may be used. These compounds are, in themselves, vulcanization accelerators and when used in conjunction with the zinc halide complexes, they tend to shorten the time required to reach a given state of cure. Representative zinc aryldithiocarbamates are zinc p-methoxydithiocarbanilate, zinc dithiocarbanilate and zinc m-chlorodithiocarbanilate.

The following examples will better illustrate the nature of the present invention; however, the invention is not intended to be limited to these examples. Parts are by weight unless otherwise indicated.

*Example 1*

A. *Preparation of zinc halide molecular complexes.*—Molecular complexes of zinc bromide with 2,2'-dithiobisbenzothiazole and with 2-mercaptobenzothiazole are prepared by agitating the appropriate molar amounts in boiling toluene under abrading conditions of agitation. The abrading conditions are attained by the addition of glass beads to the toluene. One mol of zinc bromide combines with one mol of 2,2'-dithiobisbenzothiazole while the molecular complex of zinc bromide with mercaptobenzothiazole is in the ratio of 1 mol:2 mols. Under similar conditions, zinc chloride and zinc iodide may be used to prepare molecular complexes.

B. A polyurethane polymer is prepared by adding 3 mols of toluene-2,4-diisocyanate to 1 mol of 3-(allyloxy) 1,2-propanediol and the mixture is agitated for 3 hours at 80° C. under an atmosphere of nitrogen. To this mixture is added 2 mols of polytetramethyleneether glycol of molecular weight 1000 and the mass is agitated at 80° C. for 1 hour. It is then transferred to a polyethylene-lined container and heated in an oven at 80° C. for 72 hours. A rubbery polymer is obtained which has an average of one side chain allyloxy group for each 2650 units of molecular weight. 100 parts of this polymer is compounded on a rubber roll mill with 0.75 part of sulfur, 2 parts of 2,2'-dithiobisbenzothiazole, 1 part of 2-mercaptobenzothiazole, 30 parts of high abrasion furnace black, and 0.4 part of zinc bromide/2,2'-dithiobisbenzothiazole molecular complex. The compounded elastomer is cured in a press in molds at 140° C. for 1 hour. The cured elastomer shows the following properties in water at 25° C.:

Tensile strength at the break, lbs./sq. in _____ 4450
Modulus at 300% elongation, lbs./sq. in _____ 2140
Elongation at the break, percent _____ 450

When similar amounts of the molecular complexes of 2,2'-dithiobisbenzothiazole with zinc chloride and zinc iodide are substituted in the above formulation, essentially the same results are obtained.

*Example 2*

100 parts of the polyurethane polymer prepared in 1-B above is compounded on a rubber roll mill with 30 parts of high abrasion furnace black, 1.5 parts of sulfur, 3 parts of 2,1'-dithiobisbenzothiazole, 0.75 part of 2-mercaptobenzothiazole and 0.35 part of a molecular complex of 1 mol of ZnCl₂ with 2 mols of 2-mercaptobenzothiazole. The compounded stock is cured for 40 minutes at 150° C. in molds in a press. The cured elastomer shows the following properties in water at 25° C.:

Tensile strength at the break, lbs./sq. in _____ 5100
Modulus at 300% elongation, lbs./sq. in _____ 3160
Elongation at the break, percent _____ 400

When the zinc chloride-2-mercaptobenzothiazole complex is omitted from the formulation, essentially no curing effect is observed when the compounded stock is heated at 150° C. for 40 minutes. Instead of zinc chloride, the molecular complex of 2-mercaptobenzothiazole with zinc bromide or zinc iodide can be used with substantially equivalent results.

The vulcanizates which result from the curing process of the present invention may be employed in a wide variety of uses, such as for tires, inner tubes, belts, hose and tubing, wire and cable jackets, footwear, sponges, coated fabrics, and a wide variety of coated or molded articles.

As many widely different embodiments of this invention may be made without departing from the spirit and scope thereof, it is to be understood that this invention is not limited to the specific embodiments thereof except as defined in the appended claims.

What is claimed is:

1. The process of curing a sulfur-curable polyalkylene-ether polyurethane polymer, said polymer having a side chain at least once for every 8000 units of molecular weight of polymer, said side chain containing a terminal aliphatic —CH=CH$_2$ group, which comprises incorporating therewith for each 100 parts by weight of polymer (a) from 0.5 to 2.0 parts by weight of sulfur, (b) from 2.0 to 4.0 parts by weight of 2,2'-dithiobisbenzothiazole, and (c) from 0.175 to 1.75 parts by weight of a zinc halide complex selected from the group consisting of a 1:1 molar complex of a zinc halide with 2,2'-dithiobisbenzothiazole and a 1:2 molar complex of a zinc halide with 2-mercaptobenzothiazole, wherein the zinc halide is selected from the group consisting of zinc chloride, zinc bromide and zinc iodide, and heating the polymer to a temperature of from about 100 to 170° C. so as to effect a cure.

2. The process of curing a sulfur-curable polyalkylene-ether polyurethane polymer, said polymer having a side chain at least once for every 8000 units of molecular weight of polymer, said side chain containing a terminal aliphatic —CH=CH$_2$ group, which comprises incorporating therewith for each 100 parts by weight of polymer (a) from 0.5 to 2.0 parts by weight of sulfur, (b) from 2.0 to 4.0 parts by weight of 2,2'-dithiobisbenzothiazole, and (c) from 0.175 to 1.75 parts by weight of a 2:1 molar complex of 2-mercaptobenzothiazole and zinc chloride, and heating the polymer to a temperature of from about 100 to 170° C. so as to effect a cure.

3. The process of curing a sulfur-curable polyalkylene-ether polyurethane polymer, said polymer having a side chain at least once for every 8000 units of molecular weight of polymer, said side chain containing a terminal aliphatic —CH=CH$_2$ group, which comprises incorporating therewith for each 100 parts by weight of polymer (a) from 0.5 to 2.0 parts by weight of sulfur, (b) from 2.0 to 4.0 parts by weight of 2,2'-dithiobisbenzothiazole, and (c) from 0.175 to 1.75 parts by weight of a 1:1 molar complex of 2,2'-dithiobisbenzothiazole and zinc chloride, and heating the polymer to a temperature of from about 100 to 170° C. so as to effect a cure.

References Cited in the file of this patent

UNITED STATES PATENTS 2,702,797    Rugg _____ Apr. 10, 1953